(12) United States Patent
Azeyanagi et al.

(10) Patent No.: US 9,500,996 B2
(45) Date of Patent: Nov. 22, 2016

(54) SEALING MEMBER, TONER CONVEYING DEVICE, AND IMAGE FORMING APPARATUS

(71) Applicants: Yuta Azeyanagi, Kanagawa (JP); Takeshi Kojima, Kanagawa (JP); Hajime Teraji, Kanagawa (JP); Hiromichi Ninomiya, Kanagawa (JP); Michiya Okamoto, Kanagawa (JP); Shinya Karasawa, Kanagawa (JP); Kentaroh Nodera, Kanagawa (JP); Daisuke Sawada, Kanagawa (JP)

(72) Inventors: Yuta Azeyanagi, Kanagawa (JP); Takeshi Kojima, Kanagawa (JP); Hajime Teraji, Kanagawa (JP); Hiromichi Ninomiya, Kanagawa (JP); Michiya Okamoto, Kanagawa (JP); Shinya Karasawa, Kanagawa (JP); Kentaroh Nodera, Kanagawa (JP); Daisuke Sawada, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 48 days.

(21) Appl. No.: 14/707,220

(22) Filed: May 8, 2015

(65) Prior Publication Data

US 2015/0331362 A1    Nov. 19, 2015

(30) Foreign Application Priority Data

May 15, 2014    (JP) ................. 2014-101562

(51) Int. Cl.
   *G03G 15/08* (2006.01)
   *G03G 21/10* (2006.01)
   *F16J 15/04* (2006.01)

(52) U.S. Cl.
   CPC ........... *G03G 15/0898* (2013.01); *F16J 15/04* (2013.01); *G03G 15/0877* (2013.01); *G03G 21/105* (2013.01)

(58) Field of Classification Search
   CPC ................ G03G 15/0898; G03G 15/0817; G03G 15/0855; G03G 15/0865; G03G 15/0875; G03G 15/0886; G03G 15/6502; G03G 15/6552; G03G 21/105; G03G 21/1623; G03G 21/1633; G03G 2215/0692
   USPC ......................................... 399/102
   See application file for complete search history.

(56) References Cited

U.S. PATENT DOCUMENTS

| 2009/0087215 A1* | 4/2009 | Sakuma ............ G03G 15/0898 399/105 |
|---|---|---|
| 2011/0097124 A1 | 4/2011 | Koike et al. |
| 2011/0311277 A1 | 12/2011 | Iwasaki et al. |
| 2012/0237230 A1 | 9/2012 | Karasawa et al. |
| 2013/0243444 A1 | 9/2013 | Karasawa et al. |

FOREIGN PATENT DOCUMENTS

JP    2001-201926    7/2001

* cited by examiner

*Primary Examiner* — Roy Y Yi
(74) *Attorney, Agent, or Firm* — Harness, Dickey & Pierce, P.L.C.

(57) ABSTRACT

A sealing member is attached to a second member attached to and detached from a first member having a first opening through which powder passes and having a second opening that communicates with the first opening when the second member is coupled to the first member, and prevents the powder from leaking from a coupling portion between the first opening and the second opening. The sealing member includes: a first elastic member with a first surface arranged on the second member; and a second elastic member arranged on at least a part of a periphery of the first elastic member and having hardness different from that of the first elastic member.

20 Claims, 10 Drawing Sheets

ATTACHMENT DIRECTION

ATTACHMENT DIRECTION

SEALING MEMBER, TONER CONVEYING DEVICE, AND IMAGE FORMING APPARATUS

CROSS-REFERENCE TO RELATED APPLICATIONS

The present application claims priority to and incorporates by reference the entire contents of Japanese Patent Application No. 2014-101562 filed in Japan on May 15, 2014.

BACKGROUND OF THE INVENTION

1. Field of the Invention

The present invention relates to a sealing member, a toner conveying device and an image forming apparatus.

2. Description of the Related Art

Conventional electrophotographic image forming apparatuses, such as copiers, printers, and facsimiles, form an electrostatic latent image by: applying an electric charge to the surface of a photoconductor serving as an image bearer to charge the surface; and irradiating the charged portion with optical image information, such as document reflected light and a laser beam, to expose the charged portion. The image forming apparatuses cause toner supplied from a developing device to adhere to the electrostatic latent image, thereby forming a toner image on the photoconductor. After transferring the toner image onto a recording medium with a transfer device, the image forming apparatuses apply heat and pressure to the recording medium with a fixing device, thereby fixing the toner image. Subsequently, the image forming apparatuses eject the recording medium outside thereof. Foreign matter, such as untransferred toner, is left on the surface of the photoconductor after the toner is transferred onto the recording medium. To address this, the image forming apparatuses remove the foreign matter with a cleaning device or the like and prepare for the next image formation process.

The cleaning device collects the untransferred toner (approximately 5% to 20% of the amount of the toner caused to adhere by a developing unit) left after the transfer out of the toner image formed on the photoconductor. A blade cleaning system is typically used as a cleaning unit. The blade cleaning system removes untransferred toner by causing an edge of a cleaning blade made of an elastic body, such as rubber, to abut on a cleaning target surface of a photoconductor. The untransferred toner removed by the cleaning blade is conveyed in the longitudinal direction of the cleaning device with a collecting screw or the like provided to the cleaning device. The untransferred toner is then conveyed and discharged to the outside from a collected toner discharge port formed on an end. The collected toner discharged outside the cleaning device is conveyed through a collected toner path and is transmitted to a waste toner collection bottle or the like as waste toner. Alternatively, to reduce the amount of toner consumption, the collected toner is returned to the developing device and is reused as recycled toner. The collected toner discharged from the collected toner discharge port formed on an end in the longitudinal direction of the cleaning device is conveyed to a collected toner introduction port (also serving as a new toner introduction port) formed on an end (end on the same side) in the longitudinal direction of the developing device. To convey the collected toner in this manner, a toner conveyance relay device is required serving as a relay unit that connects the collected toner discharge port and the collected toner introduction port.

The toner conveyance relay device includes a collected toner introduction port and a collected toner discharge opening. The collected toner introduction port communicates with the collected toner discharge port of the cleaning device to introduce the collected toner. The collected toner discharge opening communicates with the collected toner introduction port of the developing device to discharge the collected toner. The toner conveyance relay device is attachably and detachably arranged between the collected toner discharge port of the cleaning device and the collected toner introduction port of the developing device. The destination of the toner discharged from the collected toner discharge opening of the toner conveyance relay device can be switched between the collected toner introduction port and an introduction port of the waste toner bottle by a switching unit.

FIG. 9A is a perspective view of a configuration of a collected toner introduction opening 201 formed in a toner conveyance relay device 200 and that communicates with a collected toner discharge port of a cleaning device, which is not illustrated, to introduce collected toner. The collected toner introduction opening 201 has a rectangular shape opening upward. A flat peripheral portion 202 having a rectangular annular shape is formed on the periphery of the collected toner introduction opening 201. A guide wall 203 composed of three wall surfaces protrudes along three sides of the peripheral portion 202. The collected toner discharge port of the cleaning device, which is not illustrated, is formed on the bottom surface of a connecting unit, which is not illustrated, having an outer shape attachable along the inner wall of the guide wall 203. The collected toner discharge port opens downward so as to be aligned and communicated with the collected toner introduction opening 201. When the connecting unit is coupled to the collected toner introduction opening 201 along the inner wall of the guide wall 203, a flat and rectangular peripheral portion formed on the periphery of the collected toner discharge port is placed opposite and adjacent to the peripheral portion 202 of the collected toner introduction opening 201.

FIG. 9B illustrates a sealing member 210 for preventing toner scattering attached to the collected toner introduction opening 201. The sealing member 210 is manufactured by processing an elastic material, such as a urethane foam, into a plate having a predetermined thickness. The sealing member 210 has an opening 211 having a shape corresponding to the collected toner introduction opening 201. Because the peripheral portion 202 of the collected toner introduction port has a rectangular annular shape, the sealing member 210 also has a rectangular annular shape so as to come into contact with and cover the entire surface of the peripheral portion 202. The sealing member has an adhesive layer on one surface. With downsizing of internal parts and units in response to recent requests for downsizing of equipment, the peripheral portion 202 of the collected toner introduction opening 201 may possibly not be formed into an endless annular shape. As a result, the peripheral portion 202 may possibly have a non-annular shape with a part of the annular peripheral portion cut out, specifically a linear "U"-shape, a "C"-shape, or a "U"-shape, for example.

FIG. 10A is a perspective view of a configuration (no sealing member adheres yet) of the collected toner introduction opening 201 in another toner conveyance relay device. A reference numeral 240 denotes an introduction port that receives new toner supplied from a toner cartridge (new toner container), which is not illustrated. The introduction port is positioned so as to communicate with a collected toner introduction port (new toner introduction port) of the developing device, which is not illustrated, positioned below the introduction port. The peripheral portion 202 of the collected toner introduction opening 201 has a non-annular shape by cutting out a part of the annular peripheral portion, and a cut-out 204 is closed with a vertical wall surface 205. The requests for downsizing prevent the peripheral portion serving as space to which the sealing member adheres from having an annular large area. As a result, the peripheral portion has a non-annular small area as illustrated in FIG. 10A.

As illustrated in FIG. 10B depicting a state where a first and a second sealing members adhere, a first sealing member 220 is attached to the non-annular peripheral portion 202 and includes an elastic member 221 and a flexible sheet material 223. The elastic member 221 is made of a non-annular (linear "U"-shaped) urethane foam (sponge) having a cut-out 221a corresponding to the shape of the peripheral portion 202. The sheet material 223 is made of a material (e.g., polyethylene terephthalate (PET)) harder than that of the elastic member and is attached and adheres to the top surface of the elastic member 221. The sheet material 223 includes a non-annular (linear "U"-shaped) portion 223a, a first protrusion 223b, and a second protrusion 223c. The portion 223a adheres to the top surface of the elastic member 221, and the first protrusion 223b and the second protrusion 223c protrude from the portion 223a. The sheet material 223 covers the elastic member 221, thereby reinforcing it. The sheet material 223 is used to prevent damage caused by abrasion with the connecting unit of the cleaning device attached to and detached from the collected toner introduction opening 201 and to smoothly attach and detach the connecting unit. The first protrusion 223b and the second protrusion 223c cover the surfaces of the elastic member other than the top surface as illustrated in FIG. 10B. Thus, the first protrusion 223b and the second protrusion 223c prevent an end of the elastic member from being turned up when the toner conveyance relay device 200 is attached to a photoconductor, cleaning, and developing unit (PCDU). Both ends 221b of the cut-out 221a of the elastic member 221 are in contact with a vertical wall surface 205 or a second sealing member 230. The toner conveyance relay device 200 is moved in the arrow direction illustrated in FIG. 10B, thereby being attached to the PCDU serving as an integrated unit of the photoconductor, the cleaning device, the charging unit, and the developing device.

FIG. 11 is a view for explaining a configuration of the second sealing member alone. The second sealing member 230 is arranged in a manner adhering to the vertical wall surface 205 adjacent to the first opening 201. The second sealing member 230 cooperates with both ends 221b of the cut-out of the first sealing member 220, thereby exerting a sealing effect. Specifically, the second sealing member 230 prevents leakage of toner falling from the connecting unit (having the collected toner discharge port on the bottom surface) of the cleaning device, which is not illustrated, attached to the collected toner introduction opening 201. As illustrated in FIGS. 10B and 11, the second sealing member 230 includes a plate-shaped elastic member 231 and a flexible sheet material 232. The elastic member 231 is made of a urethane foam or the like and is laterally arranged so as to include a portion facing both ends 221b of the first sealing member 220. The sheet material 232 is made of a material harder than that of the elastic member and adheres to the surface of the elastic member 231. The elastic member 231 adheres to cover the vertical wall surface 205 from a wall surface portion with which both ends 221b of the elastic member 221 are in contact and to a corner 205a.

The sheet material 232 includes a portion 232a and a protrusion 232b. The portion 232a adheres to the front surface of the elastic member 231, and the protrusion 232b protrudes from an end 232a-1 of the portion 232a. The end 231a-1 of the elastic member 231 ends before the corner 205a of the wall surface 205, whereas the protrusion 232b of the sheet material protrudes beyond the corner 205a. The protrusion 232b is bent toward a second wall surface 205b adjacent to the corner 205a and adheres to the wall surface 205b. The protrusion 232b covers the end 231a-1 of the elastic member 231. Thus, the protrusion 232b can prevent the end 231a-1 of the elastic member 231 from being turned up by direct contact of the end 231a-1 with the photoconductor developing unit (PCDU) when the toner conveyance relay device 200 is attached to and detached from the PCDU along the attachment direction illustrated in FIG. 10A.

The protrusion 232b of the sheet material covers the end 231a-1 of the elastic member 231, thereby preventing the end from being turned up. With this configuration, however, the end 231a-1 of the elastic member 231 is crushed because the protrusion 231b is bent (curved or crooked) to adhere to the second wall surface 205b as illustrated in FIGS. 10B and 12. If the end 231a-1 is crushed, a gap is generated between the end 231a-1 and one of the ends 221b of the first sealing member 221 as illustrated in FIG. 12, resulting in insufficient sealing. The problem described above occurs not only in the joint between the collected toner discharge port of the cleaning device and the collected toner introduction opening of the toner conveyance relay device but also in any joint provided to the path through which the new toner and the collected toner are conveyed. Specifically, the problem also occurs in a joint between the toner conveyance relay device and the developing device, a joint between the toner conveyance relay device and the waste toner bottle, and a joint between the new toner cartridge and the toner conveyance relay device, for example.

Japanese Patent Application Laid-open No. 2001-201926 discloses a developer storing vessel that can reduce contamination caused by scattering of toner in replacement, increase the sealability of the toner vessel, and reduce the volume of the toner vessel, thereby achieving high recoverability and recyclability. The developer storing vessel has an opening used to discharge a powder developer stored inside thereof. The opening is covered with a plurality of sealing members having a slit through which an inserting member used to discharge the developer is inserted and pulled out. The position of the slit varies on each sealing member. The sealing member disclosed in Japanese Patent Application Laid-open No. 2001-201926, however, cannot be applied to the sealing portion in the conventional example in the first place. Thus, it is impossible to solve the defect of crush of the elastic member caused by bending the sheet material and the defect of generation of a gap between the first and the second elastic members.

In view of the above, there is a need to solve a defect of reduced sealability caused by crush of an elastic member included in a sealing member that prevents leakage of toner when two members each having an opening through which the toner passes are connected and the sealing member is arranged. There is also a need to solve a defect of reduced sealability between a first sealing member and a second sealing member caused by the crush of the elastic member included in the first sealing member in a case where sealing is performed with a combination of two sealing members to address a problem that the sufficient arrangement space for the sealing member cannot be secured due to downsizing of an image forming apparatus.

SUMMARY OF THE INVENTION

It is an object of the present invention to at least partially solve the problems in the conventional technology.

A sealing member is attached to a second member attached to and detached from a first member having a first opening through which powder passes and having a second opening that communicates with the first opening when the second member is coupled to the first member, and prevents the powder from leaking from a coupling portion between the first opening and the second opening. The sealing member includes: a first elastic member with a first surface arranged on the second member; and a second elastic member arranged on at least a part of a periphery of the first elastic member and having hardness different from that of the first elastic member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention are described below in greater detail with reference to the accompanying drawings. The following describes exemplary embodiments of the present invention. The technical scope of the present invention is not limited to the embodiments unless otherwise specified by limitation of the invention in the following description.

Figure 1:
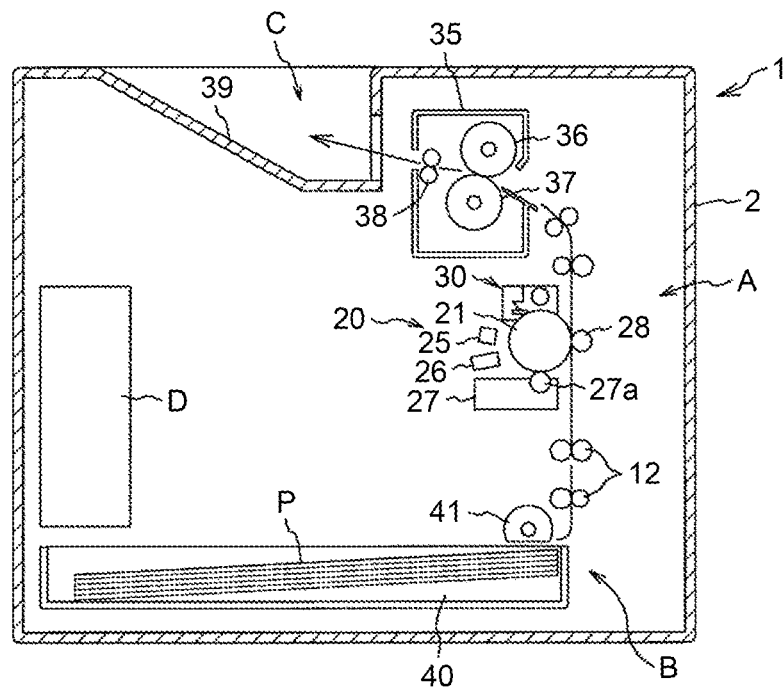
FIG. 1 is a view for explaining an internal configuration of a printer serving as an example of an electrophotographic image forming apparatus containing a cleaning device according to an embodiment of the present invention.
Figure 2:
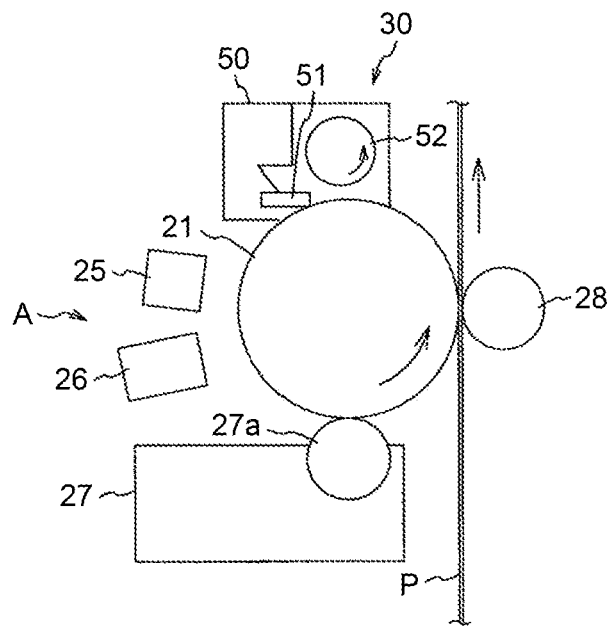
FIG. 2 is an enlarged schematic of a configuration of an image forming unit.

FIG. 1 is a view for explaining an internal configuration of a printer serving as an example of an electrophotographic image forming apparatus containing a cleaning device according to an embodiment of the present invention. FIG. 2 is an enlarged schematic of a configuration of an image forming unit. A printer (image forming apparatus) 1 includes the image forming unit A, a paper feeding unit B, a paper ejection unit C, and a controller (control unit) D in a housing 2. The image forming unit A includes an image formation unit 20 and a fixing device 35. The image formation unit 20 includes a photoconductor drum (image bearer) 21, and a charging unit 25, an exposing unit 26, a developing device 27, a transfer device 28, and a cleaning device 30 arranged around the photoconductor drum.

The paper feeding unit B is arranged upstream of the image forming unit A and includes a paper feed tray 40 and a pick-up roller 41. The paper feed tray 40 accommodates recording media P in a stacked manner. The pick-up roller 41 picks up the recording media P on the paper feed tray from the uppermost medium one by one and feeds the recording media P to the image forming unit. A recording medium fed by the pick-up roller 41 is conveyed upward through pairs of rollers 12. The recording medium P is subjected to a transfer processing of a toner image while passing through the image formation unit 20. The fixing unit 35 is arranged downstream of the image forming unit A and includes a pressure roller 36 and a heating roller 37. The fixing unit 35 applies pressure and heat to the toner image on the recording medium passing through both rollers, thereby performing fixing. The paper ejection unit C includes a paper ejection tray 39 that accommodates a piece of recording paper subjected to the fixing and ejected by a pair of paper ejection rollers 38. In the image formation performed by the image forming unit A, the charging unit 25 uniformly charges the surface of the photoconductor 21 rotating in the arrow direction. Subsequently, the exposing unit 26 irradiates the photoconductor 21 with light to partially lower the electric potential, thereby forming an electrostatic latent image. When the electrostatic latent image reaches the developing device 27 (developing sleeve 27a) and comes into contact with a toner layer, a charged toner adheres to the electrostatic latent image, thereby forming a toner image. When the toner image reaches the position of the transfer device 28, the toner image is transferred onto the recording medium P.

The toner image on the recording medium passing through the image formation unit 20 is fixed onto the recording medium P when passing through the fixing device 35.

FIG. 2 is an enlarged schematic of a configuration of the image forming unit including the cleaning device. The cleaning device 30 removes toner that fails to be transferred onto the recording medium P by the transfer device 28 and is left on the photoconductor 21, thereby cleaning the surface of the photoconductor 21. The cleaning device 30 according to the present embodiment includes a cleaning case 50, a cleaning blade 51, and a toner collecting coil (toner collecting and conveying unit) 52. The cleaning case 50 has an opening facing the surface of the photoconductor 21 rotating in the arrow direction. The cleaning blade 51 is supported by the cleaning case 50 so as to come into sliding contact with the surface of the photoconductor 21 through the opening. The cleaning blade 51 is made of an elastic body, such as rubber, and longitudinally extends in the depth direction in FIG. 2. An end edge (edge) of the cleaning blade abuts on the surface of the photoconductor 21 in a counter direction to the rotation of the photoconductor 21. In the cleaning case 50, the residual toner on the surface of the photoconductor 21 is cleaned and piled up by the cleaning blade 51 and accumulated on the edge of the cleaning blade. When the residual toner accumulated along the cleaning blade reaches a predetermined height, the residual toner is conveyed by the toner collecting coil 52 in a direction orthogonal to the paper surface and is conveyed to the outside of the cleaning device.

Explanation of an Attachment Object of a Sealing Member

Figure 3A:
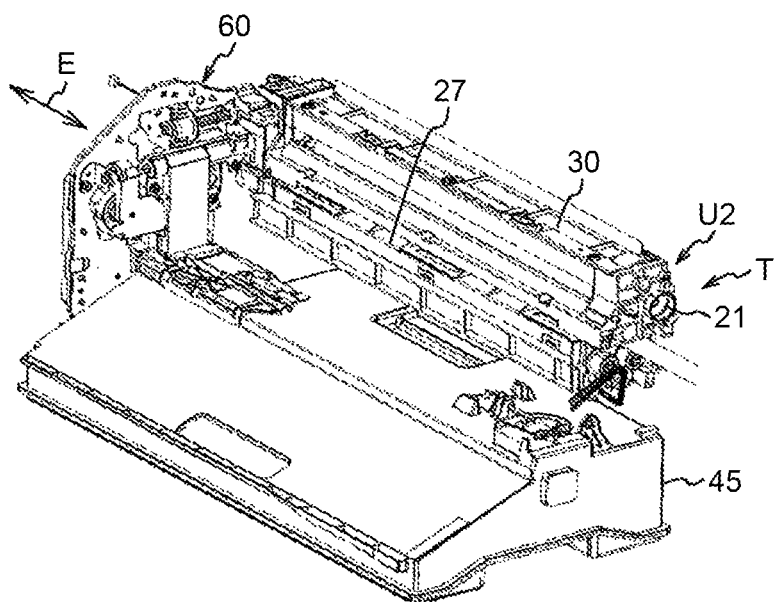
FIG. 3A is a perspective view of a state where a toner conveyance relay device and a waste toner bottle are incorporated with a photoconductor developing unit according to the embodiment of the present invention.
Figure 3B:
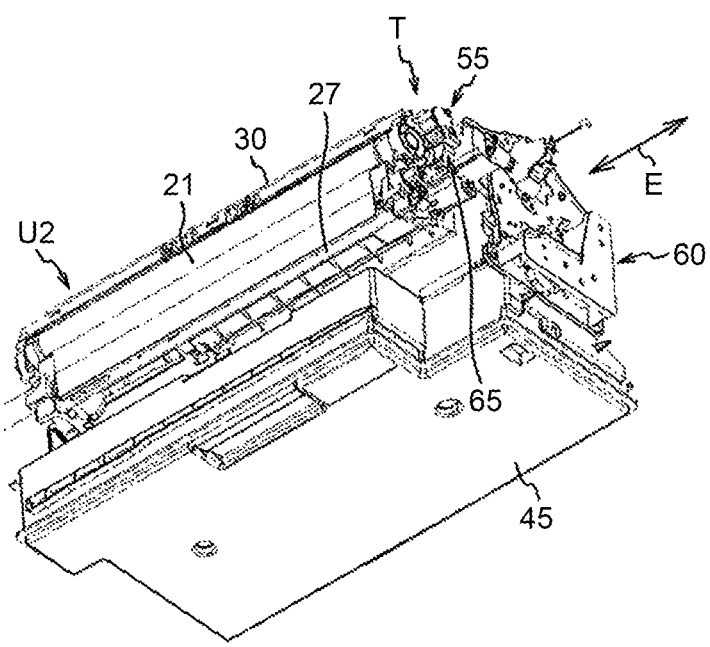
FIG. 3B is a perspective view of the state viewed from the opposite side.
Figure 4:
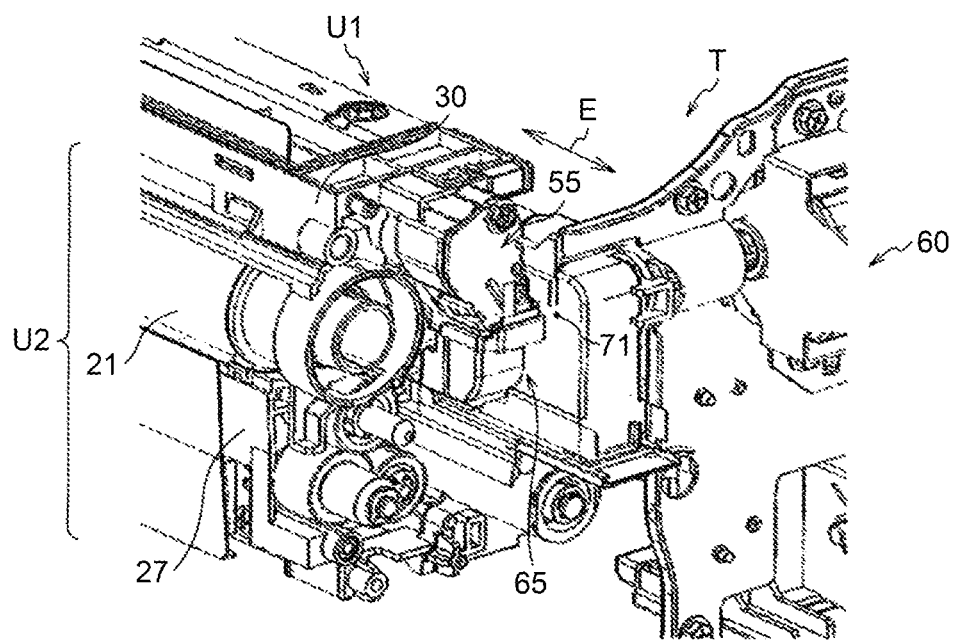
FIG. 4 is a perspective view of a state where the toner conveyance relay device is incorporated with a connecting unit of the cleaning device.
Figure 5A:
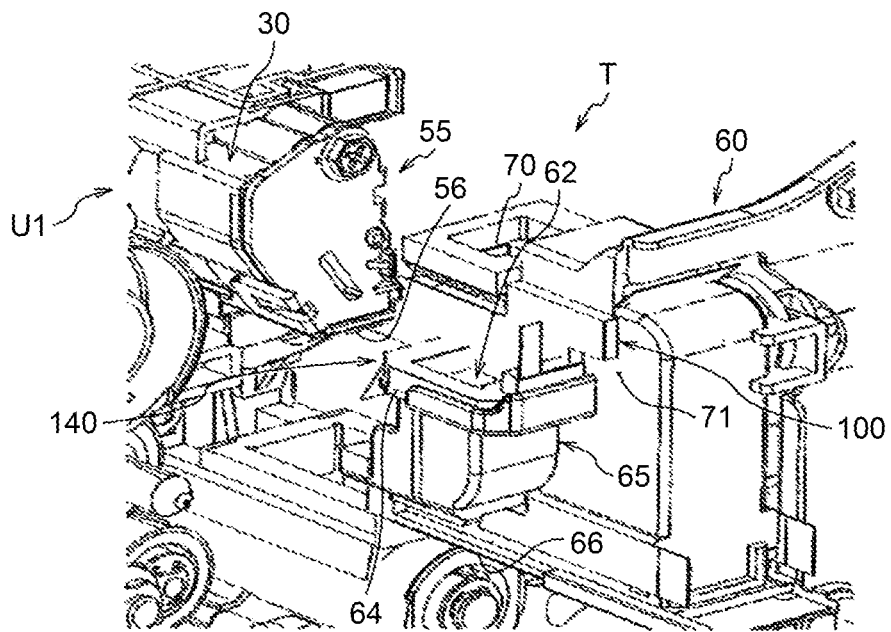
FIG. 5A is an upper perspective view of a state immediately before the toner conveyance relay device is attached to the connecting unit of the cleaning device.
Figure 5B:
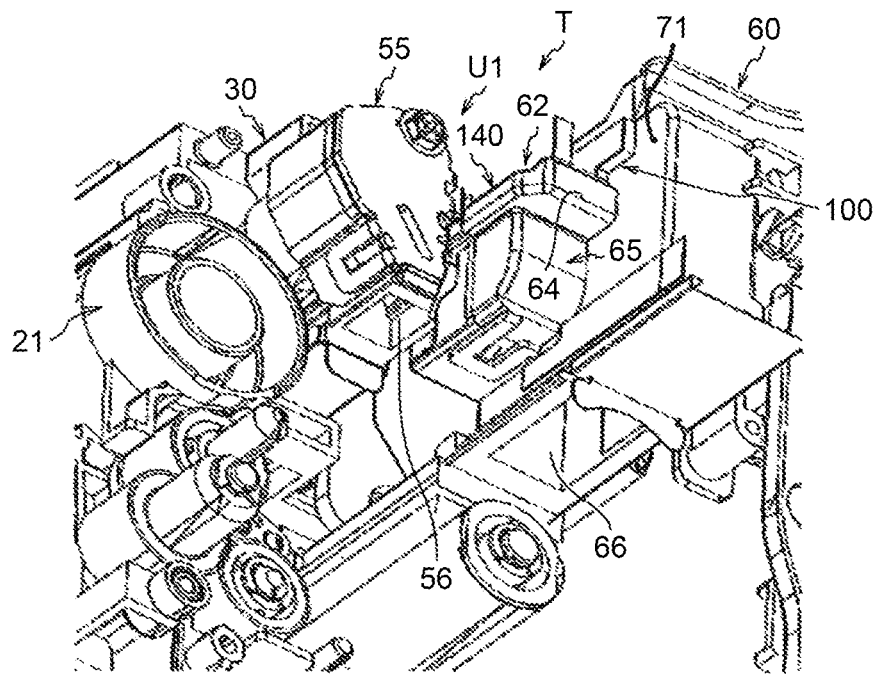
FIG. 5B is a bottom perspective view of the state.

The following describes a configuration for preventing leakage and scattering of toner from a joint between a plurality of toner conveying members (powder conveying members) with a sealing member according to the present invention. FIG. 3A is a perspective view of a state where a toner conveyance relay device and a waste toner bottle are incorporated with a photoconductor developing unit according to the embodiment of the present invention, and FIG. 3B is a perspective view of the state viewed from the opposite side. FIG. 4 is a perspective view of a state where the toner conveyance relay device is incorporated with a connecting unit of the cleaning device. FIG. 5A is an upper perspective view of a state immediately before the toner conveyance relay device is attached to the connecting unit of the cleaning device, and FIG. 5B is a bottom perspective view of the state. While a unit of the photoconductor 21, the charging unit 25, the cleaning device 30, and other components is referred to as a photoconductor and cleaning unit (PCU), the unit is referred to as a process unit U1 in the present specification. While a unit obtained by incorporating the developing device 27 with the process unit U1 is referred to as a photoconductor, cleaning, and developing unit (PCDU), the unit is referred to as a toner conveying unit U2 in the present specification. The toner conveying unit U2, a waste toner container 45, a toner conveyance relay device 60, and other components serve as a toner conveying device T.

FIGS. 3A and 3B illustrate a state where the waste toner container 45 is incorporated immediately below the developing device 27 included in the toner conveying unit U2. The collected toner discharged from a collected toner discharge port (first opening) 56 formed on an end in the longitudinal direction of the cleaning device 30 included in the toner conveying unit U2 is conveyed to a collected toner introduction port (also serving as a new toner introduction port), which is not illustrated, formed on an end (end on the same side) in the longitudinal direction of the developing device 27. To convey the collected toner in this manner, the toner conveyance relay device (toner conveying member or a second member) 60 is used. The toner conveyance relay device 60 serves as a relay unit that connects the collected toner discharge port (first opening) 56 and the collected toner introduction port. The toner conveyance relay device 60 is attached to and detached from the toner conveying unit U2 by being moved in an attachment and detachment direction indicated by an arrow E in FIGS. 3A and 3B. The collected toner discharge port (first opening) 56 is formed on the bottom surface of a connecting unit (toner conveying member or a first member) 55 protruding on an end of the cleaning device 30. The connecting unit 55 has a collected toner conveyance path communicating with the inside of the cleaning case 50 of the cleaning device. The collected toner conveyance path communicates with the collected toner discharge port 56.

The toner conveyance relay device 60 includes a conveyance relay member (second member) 65 having a relay introduction port (second opening) 62 and a relay discharge port (third opening) 66. The relay introduction port 62 communicates with the collected toner discharge port (first opening) formed on the bottom surface of the connecting unit 55 of the cleaning device and introduces the collected toner. The relay discharge port 66 communicates with the collected toner introduction port of the developing device positioned below and discharges the collected toner. The conveyance relay member 65 is arranged in the space between the collected toner discharge port 56 and the collected toner introduction port (immediately below the connecting unit 55) attachably and detachably along the direction of the arrow E. The destination of the toner discharged from the relay discharge port 66 can be switched between the collected toner introduction port of the developing device and an introduction port of the waste toner container 45 by a switching unit, which is not illustrated. In the present invention, to couple and communicate the relay introduction port (second opening) 62 formed on the top surface of the conveyance relay member 65 with the collected toner discharge port (first opening) 56 formed on the bottom surface of the connecting unit 55, a first sealing member 100 and a second sealing member 140 are arranged. The first sealing member 100 and the second sealing member 140 are arranged at a portion corresponding to a route from which the toner may possibly leak to prevent the toner from leaking and scattering from the coupling portion. While the sealing members are arranged on (adhere to) the conveyance relay member (first member) 65 in the present embodiment, the configuration is given by way of example only. In a case where the route from which the toner may possibly leak is present in the connecting unit (second member), the sealing members may be arranged at a position corresponding to the route.

The first sealing member 100 and the second sealing member 140 according to the present invention are a unit attached to the conveyance relay member (second member) 65 to prevent toner from leaking from the coupling portion between the collected toner discharge port 56 and the relay introduction port 62. The conveyance relay member 65 is attached to and detached from the connecting unit 55 (first member) of the cleaning device having the collected toner discharge port (first opening) 56 through which the toner (powder) passes (is introduced or ejected). The conveyance relay member 65 has the relay introduction port (second opening) 62 that communicates with the collected toner discharge port 56 when the conveyance relay member 65 is coupled to the connecting unit 55. In other words, the first sealing member 100 and the second sealing member 140 according to the present embodiment are attached to the conveyance relay member 65. As described above, the sealing members aim to block the route from which the toner may possibly leak. If arrangement of the sealing members on the connecting unit 55 is effective for prevention of the leakage, the sealing members may be arranged on the connecting unit 55. The first sealing member 100 and the second sealing member 140 according to the present embodiment include first elastic members 101 and 141, sheet materials 110 and 150, and second elastic members 120 and 143, respectively. A first surface of the first elastic members 101 and 141 is arranged on an outer wall and other portions of the conveyance relay member 65 corresponding to the route from which the toner may possibly leak. The sheet materials 110 and 150 have flexibility and have lower frictional resistance and are harder than the first elastic members. One surface of the sheet materials 110 and 150 is integrated with a second surface of the first elastic members 101 and 141. The second elastic members 120 and 143 are arranged on (along) at least a part of the outer periphery of the first elastic members 101 and 141, respectively, and have hardness (density and resilient force) different from that of the first elastic members.

Explanation Mainly of the First Sealing Member

Figure 6A:
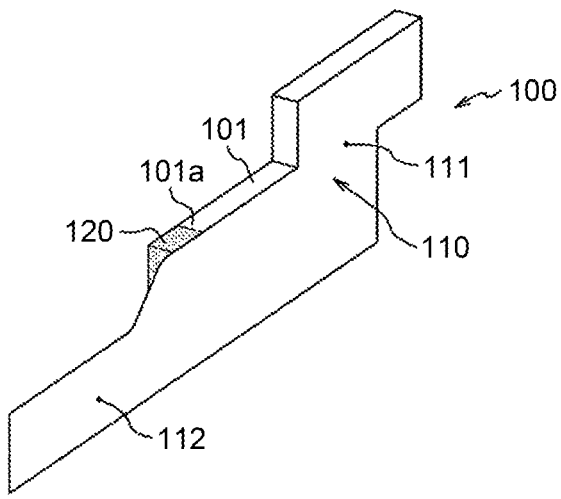
FIG. 6A is a perspective view of a configuration of a first sealing member alone.
Figure 6B:
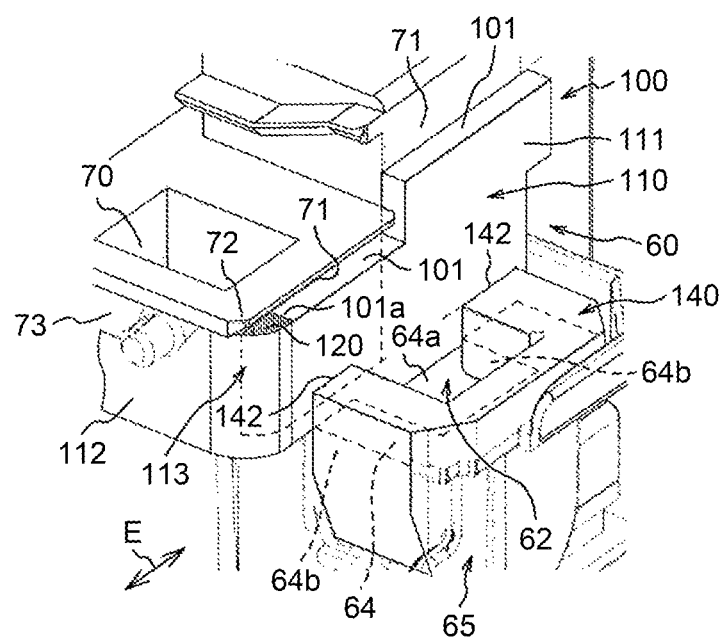
FIG. 6B is a perspective view of a state where the first sealing member and a second sealing member are attached to a conveyance relay member.

FIG. 6A is a perspective view of a configuration of the first sealing member alone, and FIG. 6B is a perspective view of a state where the first sealing member and the second sealing member are attached to the conveyance relay member (second member). The first sealing member 100 includes the first elastic member 101 having a large thickness, the sheet material 110 having a small thickness, and the second elastic member 120 having a large thickness. The first surface of the first elastic member 101 is arranged on an outer wall (intersecting outer wall surface) 71 of the conveyance relay member 65 corresponding to the route from which the toner may possibly leak. The sheet material 110 has flexibility and has lower frictional resistance and is harder than the first elastic member. One surface of the sheet material 110 is integrated with the second surface of the first elastic member 101. The second elastic member 120 is arranged on at least a part (end edge) of the outer periphery of the first elastic member 101 and has higher hardness (density) than that of the first elastic member 101. In the present embodiment, the first elastic member 101 has an adhesive layer on one surface. The thickness of the first elastic member is set approximately equal to that of the second elastic member.

The second elastic member 120 is arranged at a position along an end 101a of the first elastic member 101 extending in a direction orthogonal to (intersecting with) the attachment and detachment direction of the toner conveyance relay device 60 indicated by the arrow E. The second elastic member needs to be arranged on the outer wall 71 close to a corner 72. In addition, at least a part of the second elastic member needs to correspond to a bent portion 113 of the sheet material. The bent portion 113 is a portion where the sheet material is curved or crooked by the corner 72 as illustrated in FIG. 6B. The state where at least a part of the second elastic member corresponds to the bent portion 113 of the sheet material means a state where the bent portion 113 of the sheet material overlaps with at least a part of the second elastic member. Because the second elastic member is hard enough not to be crushed by pressuring force applied from the sheet material, it can maintain a state of not being crushed so as not to lose the sealability. In a case where the corner 72 has a curved surface, the second elastic member may be arranged so as to cover the whole or a part of the curved corner 72. The second elastic member 120 according to the present embodiment is a columnar body having a rectangular section and is provided adjacent to the end 101a of the first elastic member. The second elastic member and the first elastic member may adhere to each other or be provided side by side with the sheet material without adhering to each other. The thickness of the second elastic member is set close enough to that of the first elastic member so as not to make a difference in level when they are arranged on the outer wall 71.

The sheet material 110 is thinner than the elastic members and is made of a material having low frictional resistance, such as PET. The sheet material 110 has a protrusion 112 protruding beyond the outer periphery of the first elastic member 101 and the second elastic member 120. The protrusion 112 also has an adhesive layer on one surface. The sheet material made of PET can increase the durability of the elastic members. A reference numeral 70 denotes a new toner introduction port that receives new toner supplied from a toner cartridge (new toner supply container), which is not illustrated, arranged above and supplies the new toner to the toner introduction port of the developing device positioned below. The first outer wall (intersecting wall surface) 71 of the new toner introduction port 70 is a vertical surface. A second vertical outer wall 73 is provided adjacent to the corner (edge) 72 on the front side (front side in the attachment direction E) of the outer wall 71. The surface of the second outer wall 73 is crooked with respect to (intersecting with) the surface of the outer wall 71 at a predetermined angle. The sheet material 110 has a main part 111 and the protrusion 112. The main part 111 adheres to the first elastic member 101. The protrusion 112 protrudes from the main part beyond the second elastic member 120. The protrusion 112 has an adhesive layer on the back surface.

To attach the first sealing member 100 to the outer walls 71 and 73, the second elastic member 120 adheres to (is arranged on) the outer wall 71 close to the corner 72, and the first elastic member 101 adheres to (is arranged on) a predetermined range on the rest part of the outer wall 71. The protrusion 112 of the sheet material adheres to the surface of the second outer wall 73 beyond the corner 72. The outer wall 73 is provided adjacent to the outer wall 71 in a manner being crooked with respect to the outer wall 71 at the predetermined angle. When the protrusion 112 is bent (curved or crooked) to adhere to the outer wall 73, the tension of the protrusion applies force in a direction (thickness direction) to crush the second elastic member 120. In the present embodiment, the second elastic member 120 has higher hardness (higher density and higher resilient force) than that of the first elastic member 101. As a result, the second elastic member 120 is not excessively crushed by the force applied from the protrusion 112. This configuration can maintain high adhesion and sealability between the portion corresponding to the second elastic member 120 and the side surface of the connecting unit 55 in a state where the connecting unit 55 is attached to the surface of the first sealing member as illustrated in FIGS. 3A, 3B, and 4. Thus, it is possible to prevent leakage of the toner.

If a part of the connecting unit comes into sliding contact with the corner 72 when the toner conveyance relay device 60 is moved in the direction of the arrow E and attached to the connecting unit 55, the buffer action of the sheet material 110 having low frictional resistance can prevent the second elastic member 120 from being turned up or broken. Specifically, the direction of bend of the sheet material (protrusion) is a direction (non-intersecting direction) in which the connecting unit does not interfere with the end edge of the sheet material when the conveyance relay member 65 is attached to and detached from the connecting unit 55. In other words, the direction of bend of the sheet material is determined such that the connecting unit can smoothly pass by the corner with the sheet material covering the corner of the conveyance relay member positioned on the attachment and detachment path. The same applies to all the embodiments described below. The sheet material is not required for the sealing member according to the present invention. Specifically, the present invention can be embodied by a combination of the first elastic member and the hard second elastic member arranged directly on or separately from the peripheral edge (end) of the first elastic member. By arranging the second elastic member at a crooked portion, a curved portion, and other sealing portions likely to be subjected to external force in the attachment object, it is possible to prevent crush and increase the sealability. In this case, the elastic members are preferably made of a material having a low surface friction coefficient.

The second elastic member is attached to a corner, a projection, or a portion close to the corner or the projection of the second member (conveyance relay member 65 in the present embodiment). Such portions of the second member are likely to be subjected to high pressure of external force (folding and bending of the sheet material or contact with another member). The elastic member arranged at such a portion is likely to be crushed and lose the sealability. Therefore, the second elastic member having high hardness and less likely to be crushed is effectively arranged at such a portion. The same applies to all the embodiments described below.

Because the first elastic member 101 is soft, the first elastic member 101 does not apply excessively large pressuring force to the connecting unit 55 when the connecting unit 55 is set on the conveyance relay member 65 as illustrated in FIG. 4. Specifically, the pressuring force from the first elastic member 101 to the connecting unit is applied in a direction orthogonal to the attachment direction E (the thickness direction of the elastic member). If the pressuring force is excessively large, the connecting unit 55 set on the conveyance relay member 65 is pressed in the pressing direction. As a result, the connecting unit 55 may possibly be displaced, thereby causing leakage of the toner. By appropriately reduce the resilient force of the first elastic member, it is possible to reduce the force of pushing the connecting unit, thereby preventing the displacement. To optionally elastically deform the soft first elastic member 101, the sheet material less likely to be elastically deformed than the first elastic member may possibly serve as an obstacle. Therefore, the sheet material not adhering or fixed to the first elastic member is effectively used. Alternatively, the sheet material may only partially adhere and be fixed to the first elastic member, thereby allowing the first elastic member to be optionally deformed.

The relay introduction port (second opening) 62 surrounded by a linear "U"-shaped (discontinuous annular) peripheral portion 64 is formed (provided in a protruding manner) below the first outer wall 71 (below the opening plane of the new toner introduction port 70). Specifically, the peripheral portion 64 serving as a sealing member arrangement space is formed into a discontinuous annular shape by forming a cut-out 64a at a part of a rectangular-shaped annular body (cutting off a part of the peripheral portion). The cut-out 64a is closed with the outer wall 71 serving as another intersecting wall surface extending in a manner intersecting with the opening plane of the relay introduction port 62 (first opening). In the present embodiment, the opening plane (top surface of the peripheral portion) of the relay introduction port 62 horizontally extends, whereas the outer wall 71 vertically extends. This configuration is given by way of example only, and an outer wall obliquely intersecting with the opening plane of the relay introduction port is also included in the intersecting wall surface. When the toner conveyance relay device 60 is attached to the connecting unit 55 as illustrated in FIGS. 3A, 3B, and 4, the collected toner discharge port 56 and the peripheral portion therearound on the bottom surface of the connecting unit are positioned so as to face the relay introduction port 62 and the peripheral portion 64.

As illustrated in FIG. 6B, the second sealing member 140 adheres to (is arranged on) the peripheral portion 64 of the relay introduction port 62, thereby effectively sealing the space between the collected toner discharge port 56 and the relay introduction port 62. Two ends 142 of the second sealing member 140 serving as a discontinuous annular body are brought into contact with the surface of the first sealing member 100 (sheet material 110). This configuration can effectively prevent the toner from leaking from the cut-out 64a where the peripheral portion 64 serving as the sealing member arrangement space is not present. In other words, the cut-out of the linear "U"-shaped second sealing member 140 is closed with the "I"-shaped first sealing member 100 in a plan view of the relay introduction port 62. Thus, a defect of reduced sealability between the first sealing member and the second sealing member caused by crush of the elastic member included in the first sealing member in a case where sealing is performed with a combination of two sealing members to address a problem that the arrangement space for the sealing member cannot be secured due to downsizing of the image forming apparatus can be solved.

Explanation Mainly of the Second Sealing Member

Figure 7A:
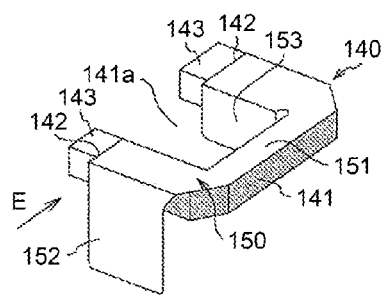
FIG. 7A is an upper perspective view of a configuration of the second sealing member.
Figure 7B:
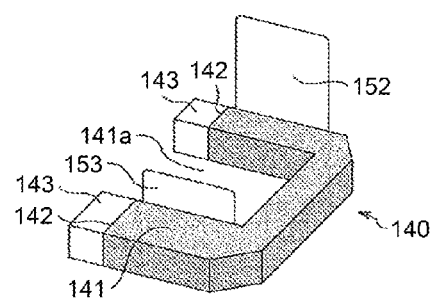
FIG. 7B is a bottom perspective view of the configuration.
Figure 7C:
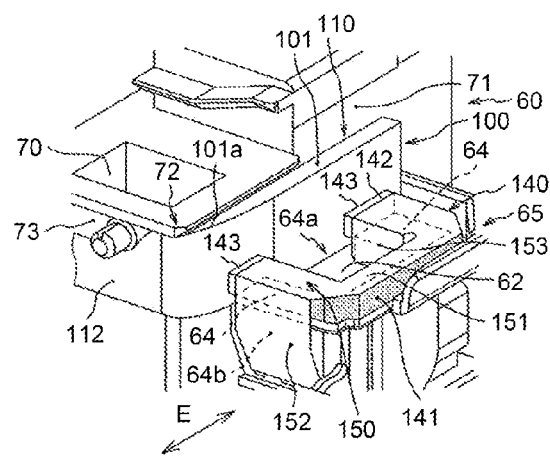
FIGS. 7C and 7D are perspective views of an attached state of the second sealing member.
Figure 7D:
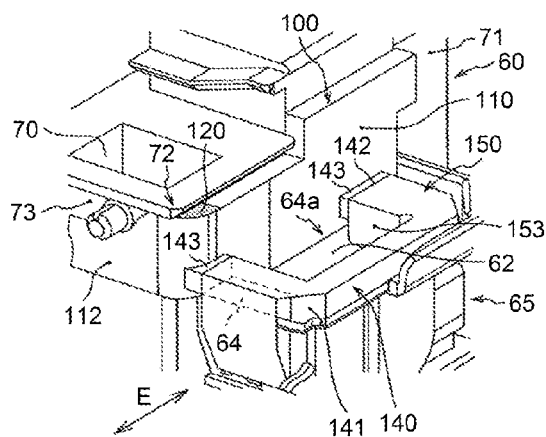
Figure 7E:
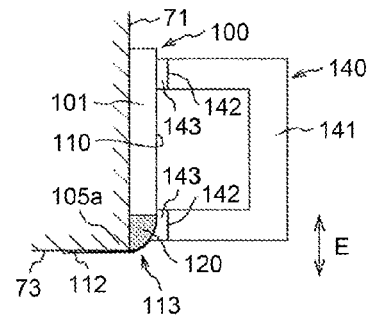
FIG. 7E is a plan view of a sealing state where the first sealing member and the second sealing member cooperate.

FIG. 7A is an upper perspective view of a configuration of the second sealing member, FIG. 7B is a bottom perspective view of the configuration, FIGS. 7C and 7D are perspective views of an attached state of the second sealing member, and FIG. 7E is a plan view of a sealing state where the first sealing member and the second sealing member cooperate.

The second sealing member 140 includes the first elastic member 141, the sheet material 150, and the second elastic member 143. The first surface of the first elastic member 141 is arranged on the conveyance relay member 65 (peripheral portion 64 of the second opening) corresponding to the route from which the toner may possibly leak. The sheet material 150 has flexibility and has lower frictional resistance and is harder than the first elastic member. One surface of the sheet material 150 is integrated with the second surface of the first elastic member 141. The second elastic member 143 is arranged on at least a part of the outer periphery of the first elastic member 141 and has hardness (density and resilient force) different from that of the first elastic member 141. In the present embodiment, the second elastic member 143 is softer (has lower density and lower resilient force) than the first elastic member 141. As illustrated in FIGS. 7A and 7B, the second sealing member 140 includes the first elastic member 141, the sheet material 150, and the second elastic member 143. The first elastic member 141 is formed into substantially the same discontinuous annular shape as the top surface of the discontinuous annular peripheral portion 64 of the relay introduction port (second opening) 62. A part of the sheet material 150 is arranged on (not fixed to or integrated with) the surface of the first elastic member. The second elastic member 143 is softer (has lower density) than the first elastic member and is fixed to both ends 142 of the first elastic member 141 in a manner protruding from the end edge of the sheet material.

The first elastic member 141 adheres to the top surface of the discontinuous annular peripheral portion 64 along the circumferential direction. The first elastic member 141 and the second elastic member 143 attached to both ends of the first elastic member 141 serve as the whole elastic member to cover the peripheral portion over the entire length in the circumferential direction. The sheet material 150 includes a portion 151 and protrusions 152 and 153. The portion 151 is fixed to the surface of the first elastic member 141. The protrusions 152 and 153 protrude from the outer periphery of the first elastic member. The protrusions 152 and 153 are arranged along the end edge of the first elastic member 141 extending in a direction intersecting with the attachment direction E of the toner conveyance relay device 60. The protrusions 152 and 153 are bent downward to adhere to a wall surface 64b, thereby covering the end edge. The sheet material 150 mainly covers the surface of the first elastic member and need not cover the surface of the second elastic member. The sheet material is not required for the sealing member 140 according to the present invention. Specifically, the present invention can be embodied by a combination of the first elastic member 141 and the soft second elastic member 143 arranged directly on or separately from the peripheral edge (end) of the first elastic member.

The peripheral portion 64 of the relay introduction port 62 is formed into a discontinuous annular shape with the cut-out 64a formed at a part of an annular body having a predetermined width. The cut-out 64a is closed with the outer wall 71 (another intersecting wall surface) extending in a manner intersecting with the opening plane (peripheral portion) 64 of the relay introduction port 62. The cut-out of the linear "U"-shaped peripheral portion 64 is closed with the "I"-shaped outer wall 71 in a plan view of the relay introduction port 62. Thus, an annular (rectangular-shaped) opening is formed as a whole. In a case where the sealing member is arranged only on the peripheral portion 64, the toner is likely to leak from the cut-out 64a. The second elastic member 143 softer than the first elastic member is arranged on both ends 142 of the first elastic member 141 corresponding to both ends of the cut-out 64a of the relay introduction port 62.

The second elastic member 143 included in the second sealing member 140 is made softer than the first elastic member 141. When the second elastic member 143 is pressed against the surface of the first sealing member 100 (another member, another portion, or the intersecting wall surface 71, for example), the second elastic member is crushed, thereby filling the gap and increasing the sealability. The first elastic member needs to have a certain degree of hardness to maintain the sealability between the first elastic member and the connecting unit 55. The second elastic member, however, may be soft because it entirely acts to maintain the sealability between the second elastic member and the first elastic member. The object with which the second elastic member 143 is in contact is not limited to another sealing member and may be another part present on the route from which the toner may possibly leak. The sheet material 150 need not adhere to (be fixed to) the surface of the second elastic member 43 having low density and likely to be elastically deformed. Adhesion of no sheet material allows the second elastic member to be arbitrarily deformed. As a result, the second elastic member can be sufficiently crushed to fill the gap between the second elastic member and the first sealing member, thereby more effectively preventing scattering of the toner. As illustrated in FIG. 7C, the protrusions 152 and 153 of the sheet material are bent at the end edges of the first elastic member 141. Thus, the protrusions 152 and 153 can cover the edges of the first elastic member, thereby preventing abrasion and damage caused by rubbing of the edges against the connecting unit 55.

A third elastic member (corresponding to the second elastic member 120 of the first sealing member 100) having higher hardness than that of the first elastic member is arranged on the edges of the first elastic member provided with the protrusions 152 and 153. This configuration can prevent the edges of the first elastic member from being crushed by external force applied via the protrusions 152 and 153. In this case, at least a part of the third elastic member needs to be arranged on the peripheral portion 64 side and correspond to a bent portion of the sheet material. By arranging at least a part of the third elastic member in a manner overlapping with the bent portion of the sheet material, it is possible to prevent crush caused by pressuring force applied from the sheet material. The direction of bend of the sheet material (protrusions) 152 and 153 is a direction (non-intersecting direction) in which the connecting unit does not interfere with the end edge of the sheet material when the conveyance relay member 65 is attached to and detached from the connecting unit 55. In other words, the direction of bend of the sheet material is determined such that the connecting unit can smoothly pass by the corner with the sheet material covering the corner of the conveyance relay member positioned on the attachment and detachment path.

The second sealing member 140 illustrated in FIGS. 7A to 7E cooperates with the first sealing member 100 arranged on the outer wall 71, thereby exerting the sealing effect. The second sealing member 140 can also be used in a case where the end of the first elastic member 101 is crushed because the first sealing member is not provided with the second elastic member having high hardness as illustrated in the example in FIG. 7C. Specifically, in a case where the end 101a of the first elastic member 101 is crushed by the bent portion of the protrusion 112 of the sheet material to reduce the sealability, the second elastic member 143 of the second sealing member adjacent to the portion can fill the gap, thereby maintaining the sealability. Specifically, sealing may be performed with a combination of two sealing members to address a problem that the sufficient arrangement space for the sealing member cannot be secured due to downsizing of the image forming apparatus. In this case, the present embodiment can solve a defect of reduced sealability between the first sealing member 100 and the second sealing member 140 caused by the crush of the elastic member included in the first sealing member 100. Furthermore, the first sealing member 100 including the second elastic member 120 having high hardness may be arranged on the outer wall 71 to eliminate (reduce) the crush of the end of the first elastic member 101 as illustrated in FIGS. 7D and 7E. In this case, it is obvious that the second sealing member 140 arranged on the periphery of the first opening 62 can exert more effective sealability.

ANOTHER EMBODIMENT

Figure 8A:
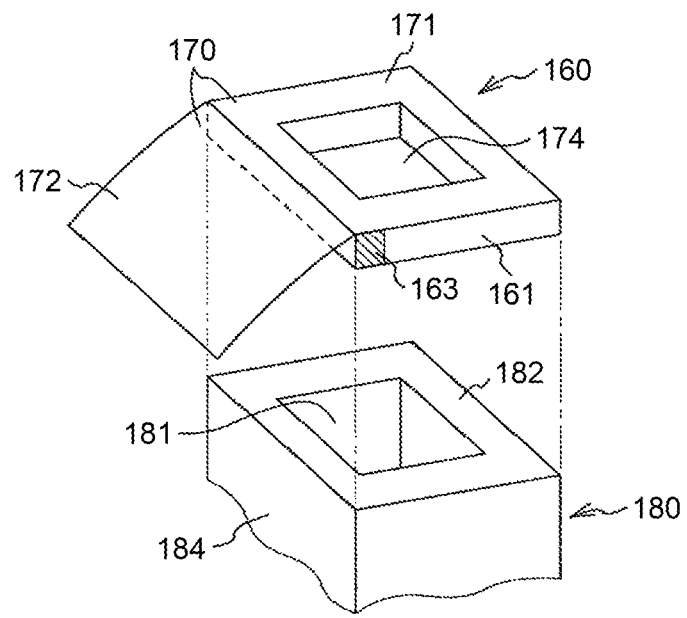
FIG. 8A is an exploded perspective view of a configuration of a sealing member and an attachment object according to another embodiment of the present invention.
Figure 8B:
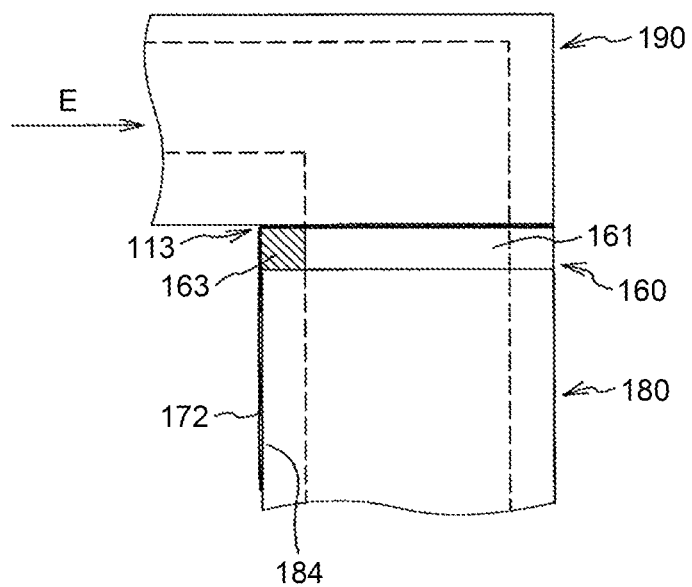
FIG. 8B is a front view of an incorporated state.
Figure 9A:
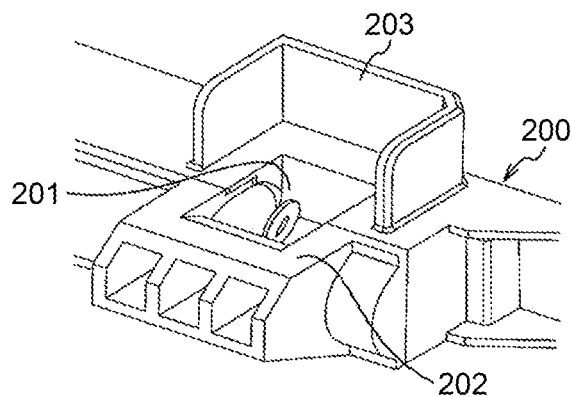
FIG. 9A is a perspective view of a first opening that communicates with a collected toner discharge port of the cleaning device to introduce collected toner according to a conventional example.
Figure 9B:
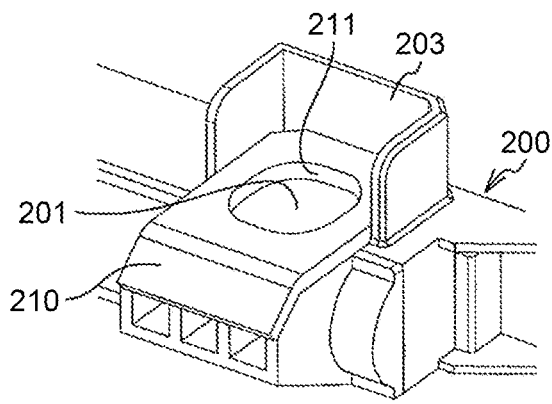
FIG. 9B is a perspective view of a sealing member for preventing toner scattering attached to the first opening.
Figure 10A:
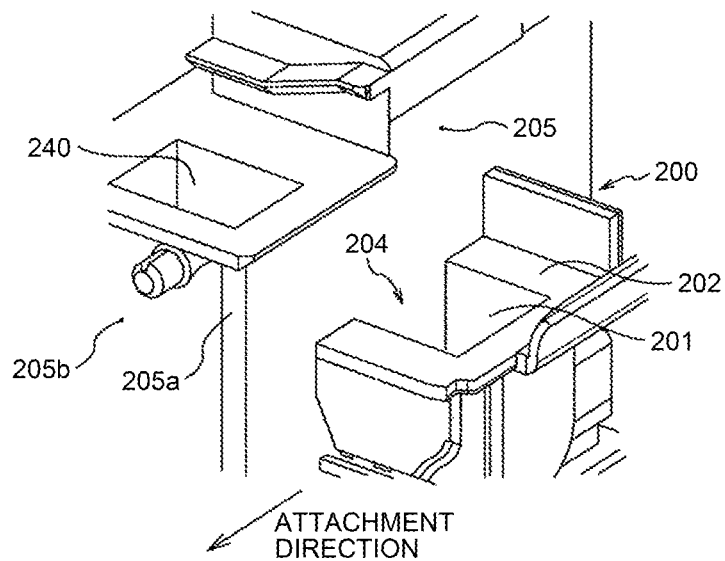
FIG. 10A is a perspective view of a configuration of the first opening in another toner conveyance relay device.
Figure 10B:
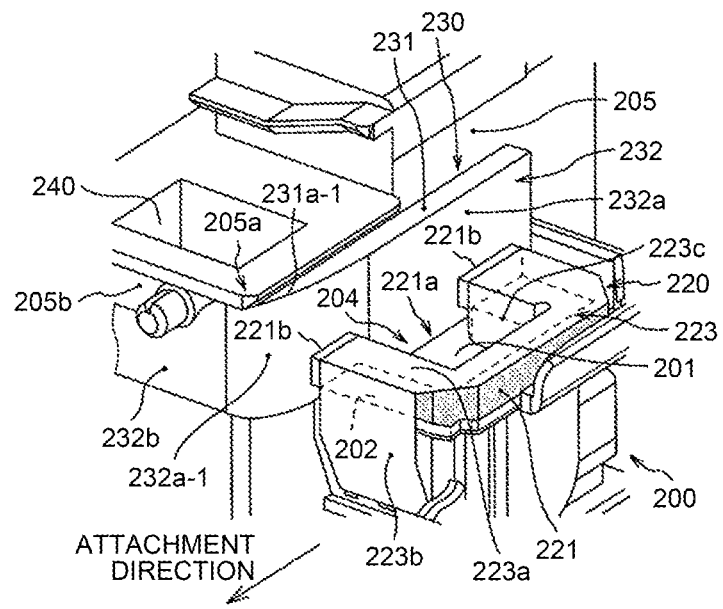
FIG. 10B is a perspective view of a state where the first sealing member and the second sealing member adhere.
Figure 11:
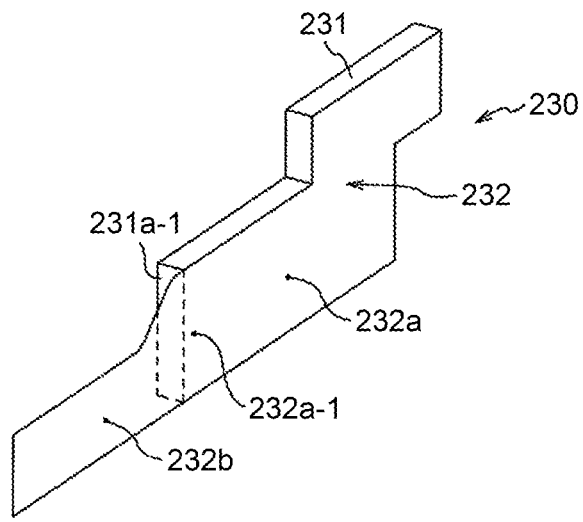
FIG. 11 is a view for explaining a configuration of the second sealing member alone.
Figure 12:
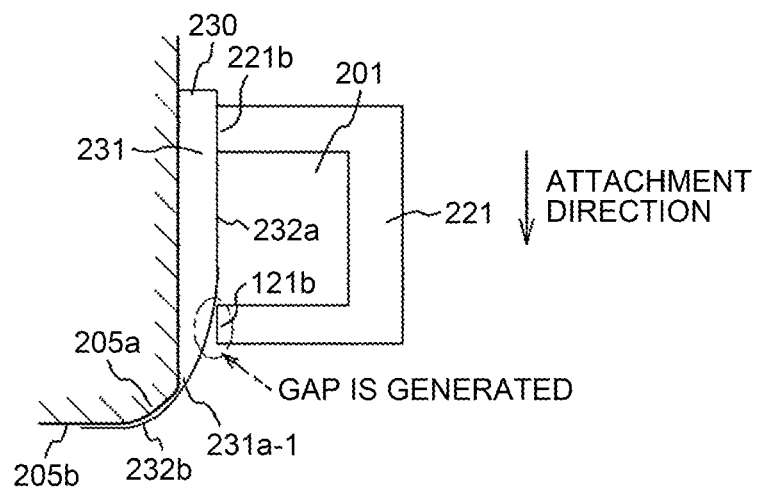
FIG. 12 is a view for explaining a state where an end of an elastic member is crushed when a protrusion of a sheet material is bent to adhere to second wall surface.

FIG. 8A is an exploded perspective view of a configuration of a sealing member and an attachment object according to another embodiment of the present invention. FIG. 8B is a front view of an incorporated state. A sealing member 160 includes an annular first elastic member 161, a second elastic member 163, and a sheet material 170. The second elastic member 163 has higher hardness (higher density and higher resilient force) than that of the first elastic member and is arranged along at least a part of the outer periphery of the first elastic member. The sheet material 170 is fixed to (adheres to) the surface of the first elastic member 161 and the second elastic member. The elastic members are made of a sponge (urethane foam), for example, and have a predetermined thickness. The sheet material is made of PET, for example.

The first elastic member 161 has an adhesive layer on the bottom surface. The sheet material 170 includes an annular portion 171 and a protrusion 172. The portion 171 is attached to the surface of the first and the second elastic members. The protrusion 172 protrudes from the end edge provided with the second elastic member 163. The protrusion 172 has an adhesive layer on the bottom surface. A first member 180 serving as an object to which the sealing member 160 is attached has an opening 181 surrounded by a rectangular annular peripheral portion 182. Toner passes through the opening. An opening of another toner conveying member 190 is connected to the top surface of the first member 180 with the sealing member 160 interposed therebetween. The first elastic member 161 has an opening 174 corresponding to the opening 181. One surface of the first elastic member adheres to the annular peripheral portion 182 of the opening 181. The protrusion 172 of the sheet material is bent as illustrated in FIG. 8B, thereby adhering to an outer wall (wall surface) 184 provided adjacent to the end edge of the peripheral portion 182 in a crooked manner. The second elastic member 163 having high hardness is arranged along the end edge of the first elastic member 161. With this configuration, if pressure is applied in a direction of crushing the second elastic member by the protrusion 172 being bent (crooked or curved), the second elastic member can maintain its shape. As a result, no toner leaks from the crushed portion. In other words, the second elastic member 163 is arranged on the peripheral portion of the second opening with at least a part thereof corresponding to the bent portion of the sheet material. This configuration can prevent reduction in the sealability caused by the crush of the first elastic member.

Another Attachment Object of the Sealing Member

In the embodiments above, the sealing members 100 and 140 are arranged at and around the relay introduction port (second opening) 62 formed in the toner conveyance relay device 60. The toner conveyance relay device 60 is arranged between the collected toner discharge port 56 of the cleaning device 30 and the collected toner introduction port of the developing device to convey the toner collected by the cleaning device 30 to the developing device 27 for recycling. The relay introduction port 62 is given by way of example of the attachment object of the sealing member according to the present invention. The sealing member according to the present invention may be attached to other joints of openings used to transmit and receive the toner between the process unit U1 (toner conveying unit U2) and the toner conveyance relay device 60. Examples of the joints include, but are not limited to, a joint between the toner conveyance relay device and the developing device, a joint between the toner conveyance relay device and the waste toner container, and a joint between the new toner (new developer) discharge port of the toner cartridge and the toner introduction port of the developing device. Attachment of the sealing member in this manner can prevent leakage of the toner.

In the toner conveying device T, the sealing member according to the embodiments above is arranged on at least one of coupling portions (connections or joints) between the toner conveying unit U2, the waste toner container 45, the toner conveyance relay device 60, and the new toner container. The toner conveying unit U2 includes the image bearer 21, the developing device 27 that supplies toner to an electrostatic latent image formed on the image bearer to make the image into a visible image, and the cleaning device 30 that removes and collects the toner left on the image bearer. The waste toner container 45 receives the collected toner discharged from the cleaning device. The toner conveyance relay device 60 is detachably attached to the toner conveying unit U2 to discharge the collected toner discharged from the cleaning device into the developing device or the waste toner container. The new toner container supplies new toner to the developing device. In other words, the sealing member according to the embodiments above may be arranged at the coupling portion between at least one of the cleaning device, the developing device, and the waste toner container and the toner conveyance relay device and/or the coupling portion between the new toner container and the developing device. Thus, the cleaning device, the developing device, the waste toner container, the toner conveyance relay device, and the new toner container correspond to the second member serving as the arrangement object of the sealing member. In the embodiment illustrated in FIGS. 6A and 6B, the connecting unit of the cleaning device may serve as the second member, and the conveyance relay member 65 of the toner conveyance relay device may serve as the first member.

Summary of the Configuration, the Action, and the Advantageous Effects of the Invention The sealing members 100, 140, and 160 according to a first aspect of the present invention are attached to the second member (second toner conveying member) to prevent powder from leaking from the coupling portion between the first opening and the second opening. The second member is attached to and detached from the first member (first toner conveying member) having the first opening 56 through which toner, a developer, or the like (powder or liquid) passes (is introduced or ejected) and has the second opening 62 that communicates with the first opening when the second member is coupled to the first member. The sealing members 100, 140, and 160 include first elastic members 101, 141, and 161 and second elastic members 120, 143, and 163, respectively. The first surface of the first elastic members 101, 141 and 161 is arranged on the second member corresponding to the route from which the powder may possibly leak. The second elastic members 120, 143, and 163 are arranged on at least a part of the outer periphery of the first elastic members and have hardness (density) different from that of the first elastic members (FIGS. 6A and 6B, 7A to 7E, and 8A and 8B).

The first member and the second member serving as the arrangement object of the sealing members are toner conveying members including a conveyance path used to convey the powder, such as toner and a developer. The cleaning device, the developing device, the waste toner container, the toner conveyance relay device, and the new toner container described in the embodiments can serve as the arrangement object of the sealing members. In other words, the arrangement object of the sealing members is not particularly limited. At least a part of the second elastic member having higher hardness and higher density than those of the first elastic members is arranged at an appropriate portion (e.g., an end or a periphery) of the first elastic members. As a result, the second sealing member is not crushed (less crushed) by external pressure. This configuration can prevent the toner from leaking from the bent portion or the like of the sheet material that causes scattering of the toner.

Examples of the external pressure that crushes the first elastic members include, but are not limited to, pressure applied from the bent portion of the sheet material adhering to the surface of the sealing members and pressure applied by peripheral members coming into contact with or rubbing against the first elastic members. In a case where the elastic members are arranged on a corner, a projection, or a curved portion of the attachment object, they are likely to be crushed by peripheral members coming into contact with or rubbing against the elastic members, resulting in reduced sealability. Therefore, the second elastic members are effectively arranged at such portions. Because the second elastic members (e.g., a plastic foam, such as a sponge, and a polyurethane foam) can resist the pressure in the crushing direction, they can prevent the first elastic members (e.g., a plastic foam, such as a sponge, and a polyurethane foam) from being crushed. Furthermore, because the first elastic members made of a soft material can be used for sealing, the repulsive force of the first elastic members to the first member can be reduced. This configuration can prevent the first member from being displaced from the normal set position by the pressure from the first elastic member. Furthermore, because the second elastic members having high density are arranged at a portion to which the force in the crushing direction is applied, the amount of crush of the elastic members can be reduced. This configuration enables sufficient sealing even on a small adhesion surface. Even if the arrangement space for the sealing members cannot be sufficiently secured at the coupling portion of the toner conveying members because of downsizing of the image forming apparatus, the configuration described above can maintain high sealability.

The first elastic members and the second elastic members may be made of the same material and have different hardness (density and resilient force) or made of different materials and have different hardness. An end and other portions of the first elastic members may possibly be crushed by coming into contact with another hard member, thereby losing the sealability. In this case, by arranging the second elastic members having high hardness at a portion likely to be crushed by the external force (a corner, a projection, or a curved portion of the attachment object or a position close to the corner, the projection, or the curved portion), the sealability can be restored. In other words, application of the sealing member according to the present invention is not limited to a case where the elastic member is crushed by the pressure applied from the sheet material.

The sealing member 100 according to a second aspect of the present invention is the first sealing member arranged at one portion of the second member. The first sealing member includes the sheet material one surface of which is arranged on (not fixed to or integrated with) the second surface of the first elastic member 101. A part of the sheet material protrudes from the periphery (the outer periphery, the end, or the end edge) of the first elastic member 101 beyond the second elastic member 120. The second elastic member is harder than the first elastic member. The first elastic member and the second elastic member are arranged on the first outer wall surface 71 of the second member 60, and the protrusion 112 of the sheet material 110 is bent and arranged on the second outer wall surface 73 intersecting with the end edge of the first outer wall surface at a predetermined angle. At least a part of the second elastic member 120 corresponds to (is positioned in) the bent portion of the sheet material (FIGS. 6A and 6B). The sheet material adheres to the elastic members, and the protrusion of the sheet material is bent at the end of the elastic members (end of the second member). This configuration can keep the second member from being exposed, thereby preventing the edge of the elastic members from being damaged by attachment and detachment of the first member to which the second member is attached. In other words, the sheet material having flexibility and low frictional properties and higher hardness than that of the elastic members, such as PET, adheres to the surface of the elastic members. This configuration can prevent the end of the sealing member from being turned up when the second member is repeatedly attached to and detached from the first member and increase the durability of the sealing member in the repetitive attachment and detachment.

The sheet material reduces sliding resistance on the surface of the elastic members, thereby preventing damage in the sealing function when the second member is attached to and detached from the first member. The hardness and the density of the first elastic member that entirely exerts the sealing function are set to normal values. This configuration can reduce the repulsive force of the first elastic member to the first member attached to the second member, thereby preventing the first member serving as a counterpart from being unnecessarily displaced. At least a part of the second elastic member corresponds to the bent portion of the sheet material. This means that the second elastic member having high hardness is arranged at a portion to which the highest pressure is applied when the protrusion of the sheet material protruding from the end of the first elastic member is bent or curved toward the end of the first elastic member. This configuration can reduce the amount of crush.

The sealing member 140 according to a third aspect of the present invention is the second sealing member arranged at another portion of the second member. The peripheral portion 64 of the second opening 62 of the second member (e.g., the toner conveyance relay device 60) is formed into a discontinuous annular shape having the cut-out 64a at a part of an annular body with a predetermined width. The cut-out 64a of the second opening is closed with the intersecting wall surface 71 intersecting with the direction of the opening plane of the second opening at a predetermined angle. The first elastic member 141 is arranged along the circumferential direction of the discontinuous annular peripheral portion of the second opening. The second elastic member 143 softer than the first elastic member is arranged on both ends 142 of the first elastic member corresponding to both ends of the cut-out of the second opening (refer to FIGS. 7A to 7E).

The annular shape indicates a shape having a continuous and endless periphery over the entire circumference and is not limited to a circle, a polygon, or an indeterminate form. The annular shape represents a structure having a peripheral portion linked and closed over the entire circumference. The discontinuous annular shape indicates a non-endless shape lacking a part of the periphery of an annular body (endless body) linked and closed over the entire circumference. Examples of the discontinuous annular shape include, but are not limited to, a rectangular shape, a C-shape, a U-shape, and other indeterminate forms. The intersecting state indicates a state where two surfaces are continuously or discontinuously arranged at a predetermined intersection angle, such as an L-shape (orthogonal) and a V-shape (at an acute angle or an obtuse angle). The surfaces need not be flat, and the intersection between the two surfaces may have a curved shape.

The first sealing member is arranged on the intersecting wall surface 71, and the discontinuous annular second sealing member is arranged on the peripheral portion 64 of the second opening. Both ends 142 of the second sealing member are caused to abut on the surface of the first sealing member, thereby sealing the cut-out. The two sealing members cooperate to effectively seal the second opening having the cut-out 64a. Particularly, the soft second elastic member 143 is arranged on both ends 142 of the first elastic member of the second sealing member. This configuration can effectively fill the gap between the first sealing member and the second sealing member. Even if the arrangement space for the sealing members cannot be sufficiently secured at the coupling portion of the toner conveying members because of downsizing of the image forming apparatus, the configuration described above can maintain high sealability.

The second elastic member 143 on both ends 142 of the second sealing member is caused to abut on a portion likely to be crushed by external force, such as the end of the first elastic member. This configuration can increase the sealability at the portion likely to be crushed. By arranging the second elastic member having high hardness on the end (portion likely to be crushed) of the first elastic member included in the first sealing member, the portion likely to be crushed can be less prone to be crushed. This configuration can increase the sealability at the portion, thereby preventing leakage and scattering of the toner. The second elastic member 143 of the second sealing member may be pressed not against the first sealing member but against another member or another portion like the intersecting wall surface 71, for example. Also in this case, the second elastic member 143 is crushed, thereby increasing the sealability.

In the sealing member according to a fourth aspect of the present invention, the second elastic member of the second sealing member is pressed against the first sealing member. The soft second elastic member included in the second sealing member comes into contact with and is crushed against the first sealing member arranged in a facing manner. This configuration can fill the gap between the first sealing member and the second sealing member, thereby preventing leakage of the toner.

The sealing member 140 according to a fifth aspect of the present invention is the second sealing member arranged at another portion of the second member. The peripheral portion 64 of the second opening 62 of the second member 60 is formed into a discontinuous annular shape having the cut-out 64a at a part of an annular body. The cut-out 64a of the second opening is closed with the intersecting wall surface 71 (a flat surface, a curved surface, or the like) intersecting with the direction of the opening plane of the second opening at a predetermined angle (e.g., a right angle, an acute angle, and an obtuse angle). The sealing member 140 further includes the sheet material one surface of which is arranged on (not fixed to or integrated with) the second surface of the first elastic member. A part of the sheet material 150 protrudes from the outer periphery of the first elastic member 141. The second elastic member is harder than the first elastic member. The first elastic member 141 is arranged on the peripheral portion 64 of the second opening 62 over the entire length in the circumferential direction. The protrusions 152 and 153 of the sheet material are bent and arranged on the second wall surface 64b intersecting with the end edge of the peripheral portion 64 of the second opening at a predetermined angle. The second elastic member is arranged on the peripheral portion of the second opening, and at least a part of the second elastic member corresponds to the bent portion of the sheet material (refer to FIGS. 7A to 7E). The first elastic member is arranged on the peripheral portion 64 of the discontinuous annular second opening 62, and the protrusions 152 and 153 of the sheet material are bent and fixed to the second wall surface 64b. By arranging the second elastic member having high hardness at the bent portion, it is possible to effectively prevent crush of the elastic member and leakage of the toner attributed to the crush.

In the sealing member 160 according to a sixth aspect of the present invention, the peripheral portion 182 of the second opening 181 of the second member 180 is an annular body having a predetermined width. The first elastic member 161 is arranged on the peripheral portion of the second opening over the entire length in the circumferential direction. The sealing member 160 includes the sheet material 170 one surface of which is arranged on (not fixed to or integrated with) the second surface of the first elastic member. A part of the sheet material 170 protrudes from the outer periphery of the first elastic member 161. The second elastic member 163 is harder than the first elastic member. The sheet material is bent and fixed to the second outer wall surface 184 intersecting with the end edge of the peripheral portion 182 of the second opening at a predetermined angle. The second elastic member is arranged on the peripheral portion of the second opening, and at least a part of the second elastic member corresponds to the bent portion of the sheet material (refer to FIGS. 8A and 8B).

While the object to which the second sealing member adheres according to the fifth aspect of the present invention is the discontinuous annular peripheral portion 64, the adhesion object according to the sixth aspect of the present invention is the annular peripheral portion 182. The first elastic member is arranged on the annular peripheral portion 182 of the second opening 181, and the protrusion of the sheet material is bent and fixed to the second wall surface 184. By arranging the second elastic member having high hardness at the bent portion, it is possible to effectively prevent crush of the elastic member and leakage of the toner attributed to the crush. In other words, the use of the sealing member according to the present invention can increase the sealability also in a case where the periphery of the opening through which the powder, such as toner, passes is an annular body. Specifically, the sealing member according to the present invention includes the annular first elastic member and the sheet material. The first elastic member adheres to the periphery of the opening. The sheet material adheres to the surface of the first elastic member, and a part of the sheet material protrudes from the end of the first elastic member. The second elastic member having high hardness is arranged at a portion to which high pressure is applied when the protrusion of the sheet material is bent. This configuration can eliminate the crush of the portion at which the sheet material is bent, thereby preventing loss of the sealability. The sheet material can prevent the elastic member from being turned up when the second member is attached to and detached from the first member and increase the durability.

In the sealing member according to a seventh aspect of the present invention, the portion to which the second elastic member is attached on the second member is a corner, a projection, or a portion close to the corner or the projection of the second member. Such portions are likely to be subjected to high pressure by the sheet material or peripheral members passing by or coming into contact with the portions. By arranging at least a part of the second elastic member at such portions, it is possible to prevent the crush and reduction in the sealability caused by the crush.

In the sealing members 100, 140, and 160 according to an eighth aspect of the present invention, the direction of bend of the sheet materials 110, 150, and 170 is a non-intersecting direction in which the second member does not interfere with the end edge of the sheet material when the second member is attached to and detached from the first member. To attach and detach the second member serving as the toner conveying member to and from the first member serving as the toner conveying member, the direction of bend of the sheet materials is set as described above. This configuration can prevent the end of the sealing members from being turned up and damaged when the toner conveying members come into sliding contact with each other.

The toner conveying device T according to a ninth aspect of the present invention at least includes the toner conveying unit U2, the waste toner container 45, the toner conveyance relay device 60, and the new toner container. The toner conveying unit U2 includes the image bearer 21, the developing device 27 that supplies toner to an electrostatic latent image formed on the image bearer to make the image into a visible image, and the cleaning device 30 that removes and collects the toner left on the image bearer. The waste toner container 45 receives the collected toner discharged from the cleaning device. The toner conveyance relay device 60 is detachably attached to the toner conveying unit U2 to discharge the collected toner discharged from the cleaning device into the developing device or the waste toner container. The new toner container supplies new toner to the developing device. The sealing member according to any one of claims 1 to 8 is arranged at the coupling portion between at least one of the cleaning device, the developing device, and the waste toner container and the toner conveyance relay device and/or the coupling portion between the new toner container and the developing device.

Because the toner is likely to leak from the joint between the toner conveying members (the first member and the second member) through which the toner passes and is conveyed, the sealing member is caused to adhere to the joint. The arrangement space for the sealing member, however, may possibly not be sufficiently secured because of downsizing of the equipment or limitation in the peripheral layout, for example. In this case, the use of the sealing member according to the present invention can maintain effective sealability in a small adhesion space. The arrangement position for the sealing member according to the present invention is not particularly restricted. The sealing member can be used for any joint between two toner conveying members. Specifically, the sealing member may be arranged at a joint between the toner conveyance relay device and other various devices or units (the cleaning device, the developing device, the waste toner container, or the new toner cartridge), and a joint between the developing device and the new toner cartridge, for example. Examples of the powder prevented from leaking by the sealing member according to the present invention also include a granular material besides the powder, such as toner and a developer. Examples of the image forming apparatus (a printer, a copier, a printing apparatus, or the like) to which the sealing member according to the present invention is applied include apparatuses having a mechanism that conveys powder or a granular material besides the apparatus that performs an electrophotographic process.

The sealing member according to an embodiment can solve a defect of reduced sealability caused by crush of a sealing member when two members each having an opening through which toner passes are connected and the sealing member is arranged.

The sealing member according to an embodiment can also solve a defect of reduced sealability on an abutment part of two sealing members in a case where sealing is performed with a combination of the two sealing members to address a problem that the sufficient arrangement space for the sealing member cannot be secured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sealing member that is attachable to a first member and a second member, the sealing member comprising:
   a first elastic member with a first surface on the second member;
   a second elastic member on at least a part of a periphery of the first elastic member and having hardness different from that of the first elastic member; and
   a part of the sheet material protrudes from a periphery of the first elastic member beyond the second elastic member.

2. The sealing member according to claim 1, wherein
   the second elastic member is harder than the first elastic member, and
   when the first elastic member and the second elastic member are on a first outer wall surface of the second member, and a protrusion of the sheet material is bent and on a second outer wall surface intersecting with an end edge of the first outer wall surface at a set angle, at least a part of the second elastic member corresponds to a bent portion of the sheet material.

3. The sealing member according to claim 2, wherein a direction of bend of the sheet material is a non-intersecting direction in which the second member does not interfere with an end edge of the sheet material when the second member is attached to and detached from the first member.

4. The sealing member according to claim 1, wherein a portion of the second member to which the second elastic member is attached is a corner, a projection, or a portion close to the corner or the projection of the second member.

5. A toner conveying device comprising at least a toner conveying unit including an image bearer, a developing device that supplies toner to an electrostatic latent image formed on the image bearer to make the electrostatic latent image into a visible image, and a cleaning device that removes and collects the toner left on the image bearer, a waste toner container that receives the collected toner discharged from the cleaning device, a toner conveyance relay device detachably attached to the toner conveying unit to discharge the collected toner discharged from the cleaning device into the developing device or the waste toner container, and a new toner container that supplies new toner to the developing device, wherein
   the sealing member according to claim 1 is at a coupling portion between at least one of the cleaning device, the developing device, and the waste toner container and the toner conveyance relay device and/or a coupling portion between the new toner container and the developing device.

6. An image forming apparatus comprising:
   the toner conveying device according to claim 5.

7. The sealing member according to claim 1, wherein the second member is attachable to and detachable from the first member having a first opening through which powder passes and having a second opening that communicates with the first opening when the second member is coupled to the first member, and that prevents the powder from leaking from a coupling portion between the first opening and the second opening.

8. The sealing member according to claim 7, wherein
a peripheral portion of the second opening of the second member is formed into a discontinuous annular shape having a cut-out at a part of an annular body with a set width, and the cut-out of the second opening is closed with an intersecting wall surface intersecting with a direction of an opening plane of the second opening at a set angle,
the first elastic member is along a circumferential direction of the peripheral portion of the second opening, and
the second elastic member softer than the first elastic member is at both ends of the first elastic member corresponding to both ends of the cut-out of the second opening.

9. The sealing member according to claim 7 including a first sealing member and a second sealing member, wherein
the sheet material is on the second surface of the first elastic member of the first sealing member,
a part of the sheet material protrudes from a periphery of the first elastic member of the first sealing member beyond the second elastic member of the first sealing member,
the second elastic member of the first sealing member is harder than the first elastic member of the first sealing member,
when the first elastic member of the first sealing member and the second elastic member of the first sealing member are on a first outer wall surface of the second member, and a protrusion of the sheet material is bent and on a second outer wall surface intersecting with an end edge of the first outer wall surface at a set angle, at least a part of the second elastic member of the first sealing member corresponds to a bent portion of the sheet material,
a peripheral portion of the second opening of the second member is formed into a discontinuous annular shape having a cut-out at a part of an annular body with a set width, and the cut-out of the second opening is closed with the first outer wall surface intersecting with a direction of an opening plane of the second opening at a set angle,
the first elastic member of the second sealing member is along a circumferential direction of the peripheral portion of the second opening, and
the second elastic member of the second sealing member softer than the first elastic member of the second sealing member is at both ends of the first elastic member of the second sealing member corresponding to both ends of the cut-out of the second opening, and
the second elastic member of the second sealing member is pressed against the first sealing member.

10. The sealing member according to claim 7, wherein
a peripheral portion of the second opening of the second member is formed into a discontinuous annular shape having a cut-out at a part of an annular body, and the cut-out of the second opening is closed with an intersecting wall surface intersecting with a direction of an opening plane of the second opening at a set angle,
a part of the sheet material protrudes from an outer periphery of the first elastic member,
the second elastic member is harder than the first elastic member,
the first elastic member is over an entire length of the peripheral portion of the second opening in a circumferential direction,
a protrusion of the sheet material is bent and on a second outer wall surface intersecting with an end edge of the peripheral portion of the second opening at a set angle, and
the second elastic member is on the peripheral portion of the second opening, and at least a part of the second elastic member corresponds to a bent portion of the sheet material.

11. The sealing member according to claim 10, wherein a direction of bend of the sheet material is a non-intersecting direction in which the second member does not interfere with an end edge of the sheet material when the second member is attached to and detached from the first member.

12. The sealing member according to claim 7, wherein
a peripheral portion of the second opening of the second member is an annular body having a set width,
the first elastic member is over an entire length of the peripheral portion of the second opening in a circumferential direction,
a sheet material with one surface on a second surface of the first elastic member is provided,
a part of the sheet material protrudes from an outer periphery of the first elastic member,
the second elastic member is harder than the first elastic member,
the sheet material is bent and fixed to a second outer wall surface intersecting with an end edge of the peripheral portion of the second opening at a set angle, and
the second elastic member is on the peripheral portion of the second opening, and at least a part of the second elastic member corresponds to a bent portion of the sheet material.

13. The sealing member according to claim 12, wherein a direction of bend of the sheet material is a non-intersecting direction in which the second member does not interfere with an end edge of the sheet material when the second member is attached to and detached from the first member.

14. A sealing member that is attachable to a first member and a second member, the sealing member comprising:
a first elastic member with a first surface on the second member;
a second elastic member on at least a part of periphery of the first elastic member and being harder than the first elastic member; and
a sheet material on a second surface of the first elastic member,
wherein the second elastic member and the sheet member are on a corner of the second member.

15. The sealing member according to claim 14, wherein a part of the sheet material protrudes from a periphery of the first elastic member beyond the second elastic member.

16. The sealing member according to claim 14, wherein the second member is attachable to and detachable from the first member having a first opening through which powder passes and having a second opening that communicates with the first opening when the second member is coupled to the first member, and that prevents the powder from leaking from a coupling portion between the first opening and the second opening.

17. The sealing member according to claim 16, wherein
a peripheral portion of the second opening of the second member is formed into a discontinuous annular shape having a cut-out at a part of an annular body with a set width, and the cut-out of the second opening is closed with an intersecting wall surface intersecting with a direction of an opening plane of the second opening at a set angle, the first elastic member is along a circumferential direction of the peripheral portion of the second opening, and the second elastic member softer than the first elastic member is at both ends of the first elastic member corresponding to both ends of the cut-out of the second opening.

18. The sealing member according to claim 16 including a first sealing member and a second sealing member, wherein the sheet material is on the second surface of the first elastic member of the first sealing member, a part of the sheet material protrudes from a periphery of the first elastic member of the first sealing member beyond the second elastic member of the first sealing member, the second elastic member of the first sealing member is harder than the first elastic member of the first sealing member, when the first elastic member of the first sealing member and the second elastic member of the first sealing member are on a first outer wall surface of the second member, and a protrusion of the sheet material is bent and on a second outer wall surface intersecting with an end edge of the first outer wall surface at a set angle, at least a part of the second elastic member of the first sealing member corresponds to a bent portion of the sheet material, a peripheral portion of the second opening of the second member is formed into a discontinuous annular shape having a cut-out at a part of an annular body with a set width, and the cut-out of the second opening is closed with the first outer wall surface intersecting with a direction of an opening plane of the second opening at a set angle, the first elastic member of the second sealing member is along a circumferential direction of the peripheral portion of the second opening, and the second elastic member of the second sealing member softer than the first elastic member of the second sealing member is at both ends of the first elastic member of the second sealing member corresponding to both ends of the cut-out of the second opening, and the second elastic member of the second sealing member is pressed against the first sealing member.

19. The sealing member according to claim 16, wherein a peripheral portion of the second opening of the second member is formed into a discontinuous annular shape having a cut-out at a part of an annular body, and the cut-out of the second opening is closed with an intersecting wall surface intersecting with a direction of an opening plane of the second opening at a set angle, a part of the sheet material protrudes from an outer periphery of the first elastic member, the second elastic member is harder than the first elastic member, the first elastic member is over an entire length of the peripheral portion of the second opening in a circumferential direction, a protrusion of the sheet material is bent and on a second outer wall surface intersecting with an end edge of the peripheral portion of the second opening at a set angle, and the second elastic member is on the peripheral portion of the second opening, and at least a part of the second elastic member corresponds to a bent portion of the sheet material.

20. The sealing member according to claim 16, wherein a peripheral portion of the second opening of the second member is an annular body having a set width, the first elastic member is over an entire length of the peripheral portion of the second opening in a circumferential direction, a sheet material with one surface on a second surface of the first elastic member is provided, a part of the sheet material protrudes from an outer periphery of the first elastic member, the second elastic member is harder than the first elastic member, the sheet material is bent and fixed to a second outer wall surface intersecting with an end edge of the peripheral portion of the second opening at a set angle, and the second elastic member is on the peripheral portion of the second opening, and at least a part of the second elastic member corresponds to a bent portion of the sheet material.

* * * * *